May 30, 1944.  H. V. WILCOXSON  2,350,005

INTERNAL COMBUSTION ENGINE

Filed Feb. 23, 1940  4 Sheets-Sheet 1

H. V. WILCOXSON
INVENTOR.

ATTORNEYS

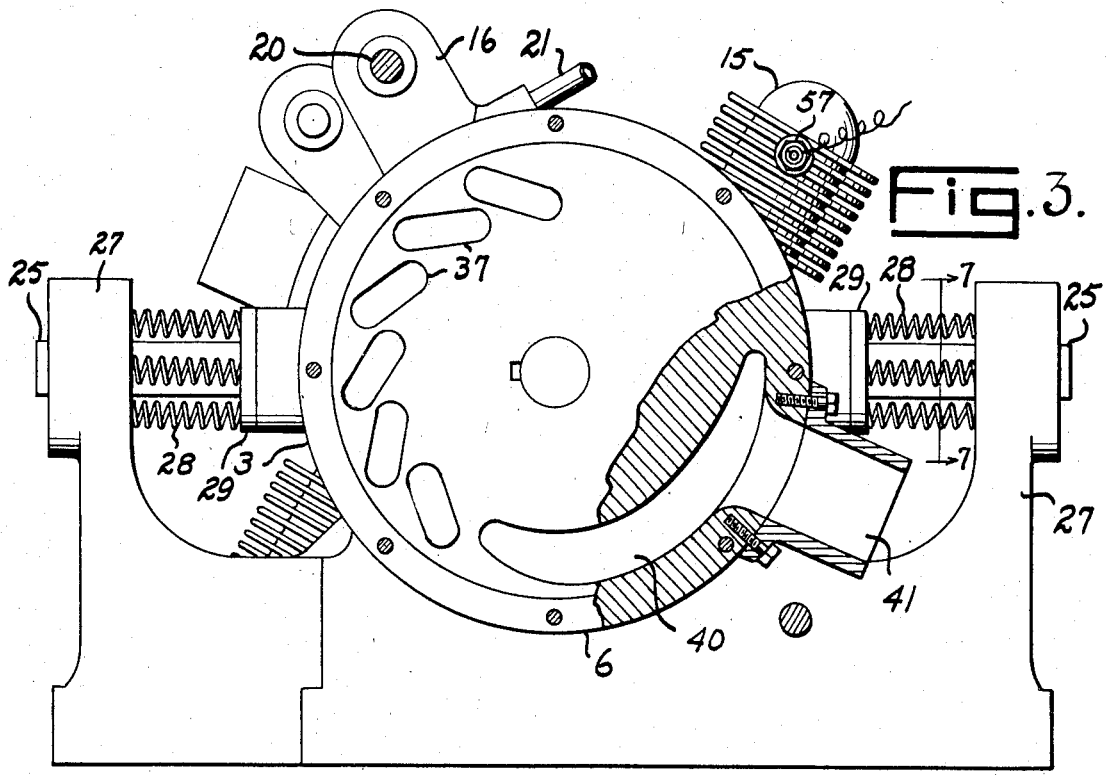
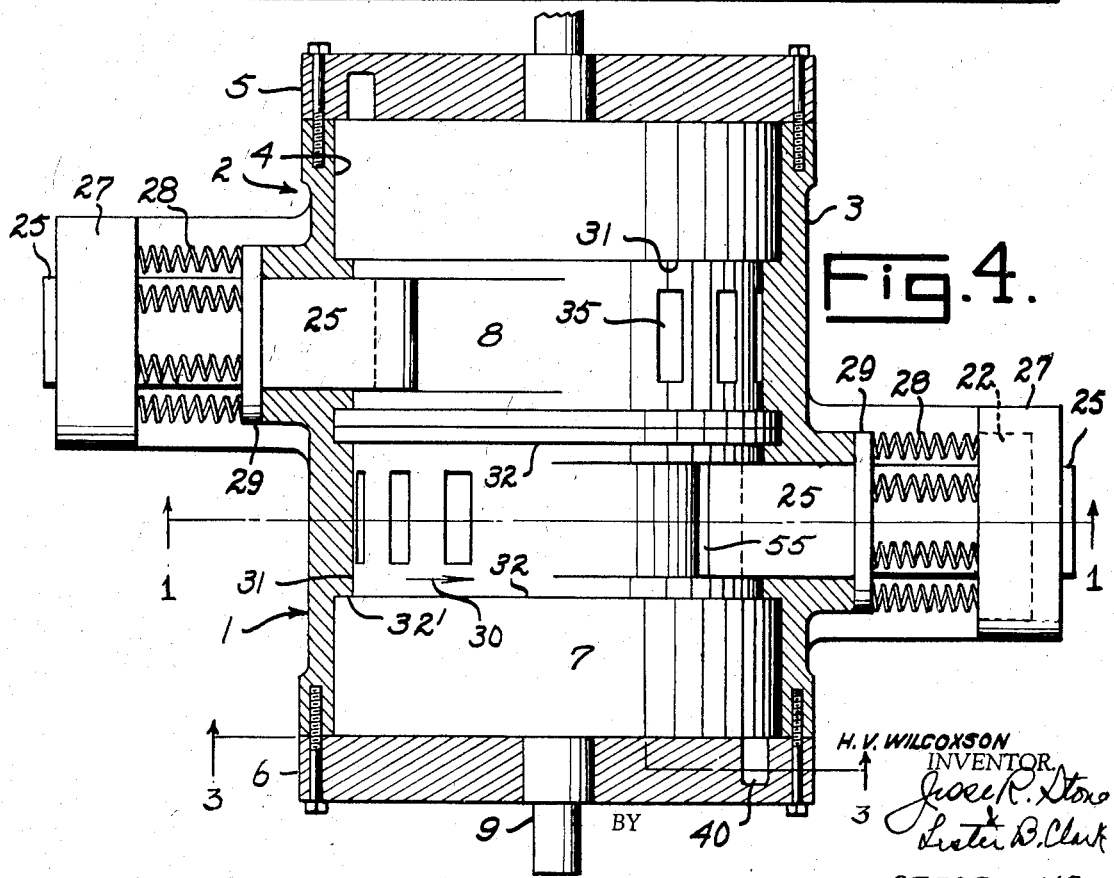

May 30, 1944.  H. V. WILCOXSON  2,350,005
INTERNAL COMBUSTION ENGINE
Filed Feb. 23, 1940  4 Sheets-Sheet 3

H. V. WILCOXSON
INVENTOR.

BY Jesse R. Stone
Lester B. Clark
ATTORNEYS

May 30, 1944.  H. V. WILCOXSON  2,350,005
INTERNAL COMBUSTION ENGINE
Filed Feb. 23, 1940  4 Sheets-Sheet 4

H. V. WILCOXSON
*INVENTOR.*

BY Jesse K Stone
Lester B Clark
*Attorneys.*

Patented May 30, 1944

2,350,005

UNITED STATES PATENT OFFICE 2,350,005

INTERNAL-COMBUSTION ENGINE

Henry V. Wilcoxson, Lubbock, Tex.

Application February 23, 1940, Serial No. 320,290

1 Claim. (Cl. 60—41)

This invention relates to new and useful improvements in an internal combustion engine, particularly an engine of the rotary type and in which the expanding gases are conducted thru passages in a rotor where the change in direction and expansion of the gases impart the energy of such gases to the rotor.

A primary object is to provide an internal combustion engine which is simple in construction and efficient in operation.

Another object is to provide a rotary type of internal combustion engine in which the energy of an expanding gas is transferred to the rotor by controlling the direction and expansion of the gas as it passes thru the rotor.

Another object is to provide means for admitting cooling air to the rotor of the engine during a portion of each revolution of the rotor.

Still another object is to provide an internal combustion engine in which the number and mass of reciprocating parts are minimized.

A more specific object is to provide an internal combustion engine of the rotary type in which the rotor is so constructed as to provide an intake chamber for a combustible gas and to cooperate with valve means to compress such gas within a combustion chamber within which the gas is ignited.

The foregoing objects together with other objects will be apparent from the following description taken in connection with the accompanying drawings in which:

Fig. 3 is a partial sectional view taken on the line 3—3 in Fig. 4;

Fig. 4 is a plan view partly in section of the illustrated embodiment of the invention;

Figure 1:
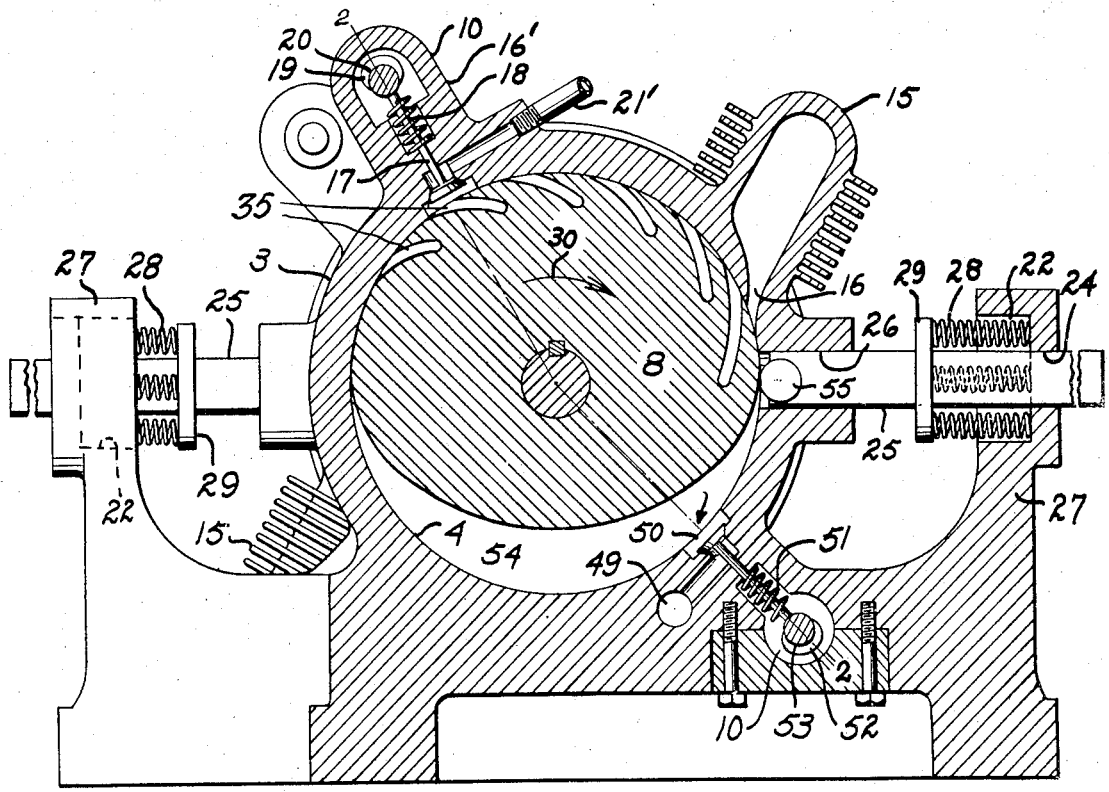
Fig. 1 is a sectional view thru one unit of a construction embodying the invention and is taken on the line 1—1 in Fig. 4.

For purposes of proper balancing it is intended that the engine embodying the invention shall comprise units in multiples of two and such units will bear such relative angular relation that the desired operating characteristics will be realized. The illustrative drawings disclose an engine comprising two units referred to as 1 and 2 which are relatively oriented at 180°. For simplicity in explanation, portions of the following description are directed to but one of these identical units.

The numeral 3 refers to a stator or base having an internal cylindrical bore 4 which is closed at its ends by heads 5 and 6, thus forming an internal chamber within which rotors 7 and 8 are mounted upon a shaft 9 passing thru openings in the heads 5 and 6. The shaft 9 is operatively connected to valve mechanisms generally referred to as 10 and also serves as the output shaft for the engine.

Secured to and forming a part of the stator 3 is the firing or combustion chamber 15 having an orifice or passageway 16 which leads to the chamber interiorly of the stator. In advance of the orifice 16, assuming rotation of the engine in a clockwise direction as viewed in Fig. 1 and as indicated by the arrow 30, is an intake valve housing 16' provided with a valve 17 which is normally held in closed position by means of a spring 18 and which is moved to open position by means of a cam surface 19 on the camshaft 20 which is driven by means of a chain or other suitable driving means indicated as 21 in Fig. 2. A suitable intake for combustible gas is provided in the conduit 21' from any suitable vaporizing or supercharging mechanism (not shown) as well known in the art.

Rearwardly of the orifice 16 there is provided a sliding abutment 25 which passes thru an opening 26 in the wall of the stator 3. The outer end of this abutment is guided thru an opening 24 in a support 27 integral with the stator and providing a chamber 22 about the valve member to receive springs 28 which engage a flanged portion 29 of the abutment so that the abutment will be constantly forced inwardly to serve a purpose that will more fully appear.

Figure 2:
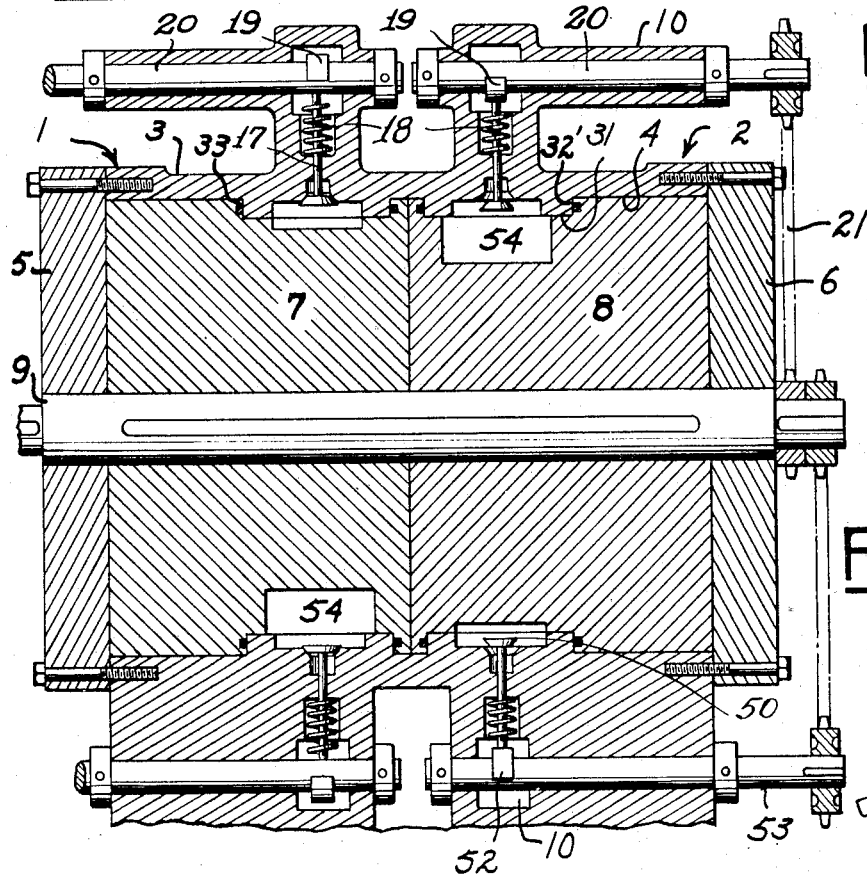
Fig. 2 is a sectional view taken on the line 2—2 in Fig. 1.
Figure 5:
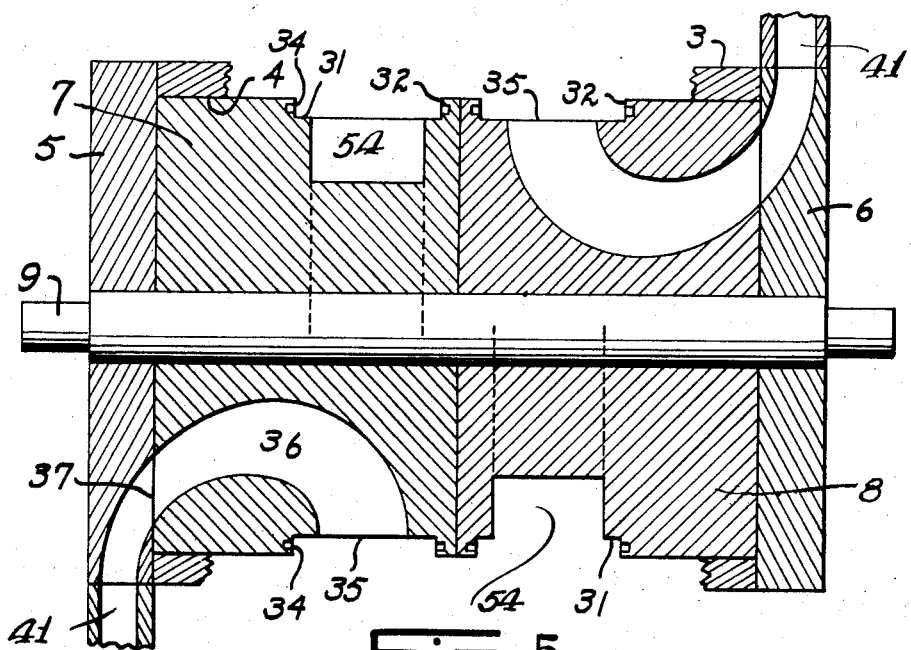
Fig. 5 is a sectional view of the rotors showing the arrangement of the gas passages therein and the manner of exhausting the expanding gases from these passages.

As already indicated the rotor is adapted to rotate in a clockwise direction as viewed in Fig. 1 and as indicated by the arrow 30. This rotor has an annular peripheral groove 31 providing spaced shoulders 32 which fit in close contact with complementary shoulders 32' interiorly of the stator 3. Compression rings 33 (Fig. 2) are provided in grooves 34 in the shoulders 32 to effect a seal between these complementary shoulders.

As best seen in Fig. 1 a portion of the rotor 8 is cut away at 54 between the shoulders 32 formed by the groove 31, such cut away portion gradually increasing in depth from points spaced approximately 180° on the periphery of the rotor and being of such width as to receive the inner end of the sliding abutment 25 and to form a seal therewith. It is believed apparent that as the rotor revolves and the cut away portion approaches the sliding abutment 25, any gases entrapped therein will be forced thru the orifice 16 and into the compression chamber 15. Such entrapped gases will obviously be those remaining within the chamber during the preceding revolution and also those admitted thru the conduit 21 and the valve 17 during the intake portion of the revolution of the rotor.

The rotor is also provided with a plurality of radial openings 35 intermediate the shoulders 32 formed by the groove 31, such openings leading thru diverging passageways 36 to the exhaust openings 37 at the outer end of the rotor. The openings 35 are of less width than the cut away portion 54 and hence the inner end of the sliding abutment 25 will not enter such openings as the rotor revolves.

The passageways 36 diverge constantly from the openings 35 to the exhaust openings 37 and are also substantially U-shaped so that the gases are reversed in direction and simultaneously expanded whereby the energy of such gases is imparted to the rotor to effect rotation thereof. The exhaust openings 37 move into mating relation with the exhaust chamber 40 in the head 6, such chamber having a generally radial exhaust outlet 41 so that the burned gases can be exhausted to the atmosphere.

Another feature of the invention resides in the provision of a scavenging valve 50 which is provided rearwardly of the sliding abutment 25. This abutment is normally held in closed position by means of the spring 51 but is operable by means of the cam 52 on cam shaft 53 of the valve actuating mechanism 10. The timing of this valve will be such that opening will occur after the cut away portion or intake chamber 54 of the rotor 8 has passed the valve inlet. The opening of the valve serves to admit cool air from exteriorly of the stator 3 through the port 49 to the portion of the rotor in which the passageways 36 are provided.

Figure 6:
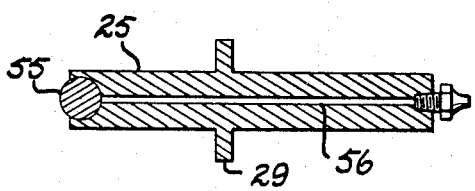
Fig. 6 is a detail sectional view of the tongue or compression valve.
Figure 7:
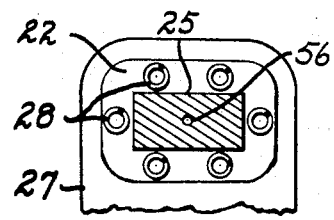
Fig. 7 is a sectional view taken on line 7—7 in Fig. 3.
Figure 8:
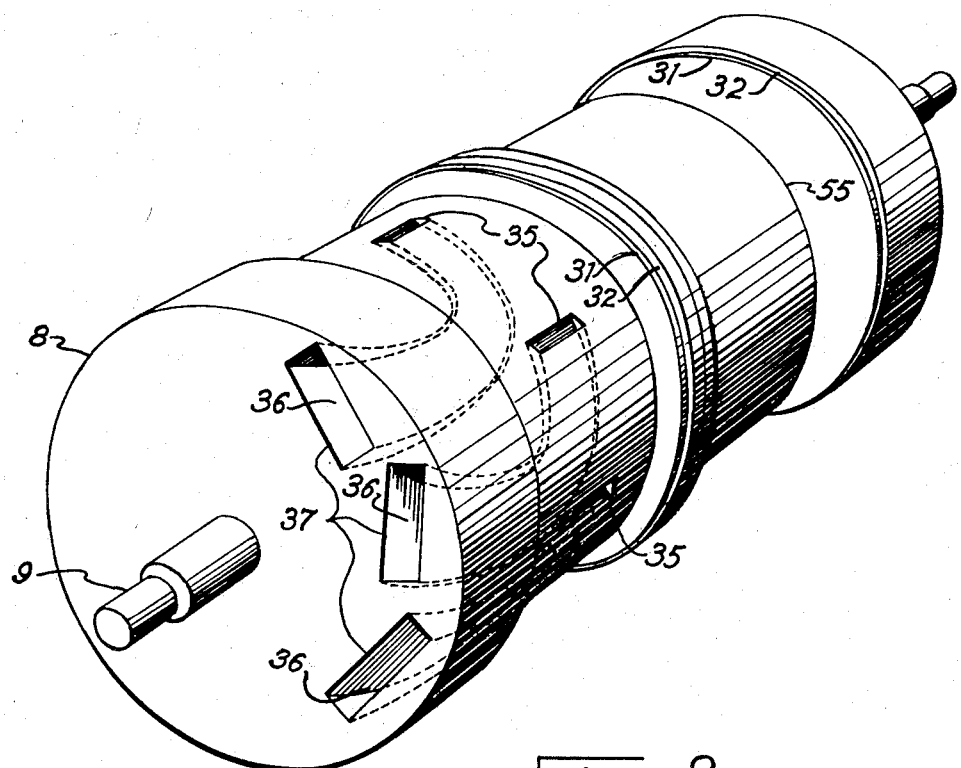
Fig. 8 is a perspective view of the rotor illustrating the configuration of the passages therein.

The sliding abutment 25 (Fig. 6) is provided at its inner end with a roller 55 which is provided with a lubricant thru a passage way 56 longitudinally of the abutment. The lubricant so supplied is instrumental in providing the necessary lubrication to the roller and to provide a desired seal between the sliding abutment and the rotor so that leakage of gases from within the chamber 54 past the sliding abutment will be avoided. In this manner the intake gases are driven thru the orifice 16 and into the compression chamber 15 for combustion as by a suitable spark supplied thru the spark plug 57.

In the operation of the illustrated embodiment of the invention power is applied to the shaft 9 from any suitable source, such as the conventional starter (not shown). The intake chamber 54, after passing the sliding abutment 25, is at sub-atmospheric pressure and when such chamber reaches the intake valve 17 and such valve opens a charge of combustible gas will be admitted thereto thru the conduit 21.

Continued rotation of the rotor causes the sliding valve 25 to enter the intake chamber 54 and force the combustible gases therefrom and into the compression chamber 15 by way of orifice 16. After the chamber 15 is fully charged with the combustible gas an igniting spark is supplied thru the spark plug 57 whereupon combustion of the confined gas takes place. As soon as the first of the openings 35 reaches the orifice 16 a portion of this gas will expand into and thru the passageway 36 associated therewith, thus imparting driving torque to the rotor. During continued rotation of the rotor the remaining gases of combustion within the chamber 15 will successively enter the openings 35 so that the entire energy from the expanding gas will be extracted therefrom and imparted to the rotor and thence to the drive shaft 9.

After the intake chamber 54 has passed the scavenging valve 50 the cam 52 will move into position to open such valve and admit cooling and scavenging air to the interior of the stator 3 and to the openings 35 and passageways 36 passing adjacent this valve. It is understood that the valve 50 will subsequently close before the intake chamber 54 has reached a position at which air thru the scavenging valve will enter such chamber.

What is claimed is:

An internal combustion engine comprising, a stator having an inlet and an outlet, a gas receiving chamber associated with the stator and having an opening to the interior thereof, means to admit a fuel charge to said chamber, a rotor within the stator, said rotor having a plurality of diverging passageways in an angular portion thereof from the periphery to one end of the rotor to conduct gases of combustion from the opening through the diverging passageways to the outlet so that torque is applied to the rotor by the expanding gases, means operable during another angular portion of each revolution of the rotor for compressing a combustible gas within said chamber, means operable thereafter for igniting the gases within the chamber, and valve means operable during the passage of said first mentioned angular portion thereby for admitting a cooling fluid to the rotor passages.

HENRY V. WILCOXSON.